United States Patent
Callard

(10) Patent No.: US 9,998,355 B2
(45) Date of Patent: Jun. 12, 2018

(54) METHODS AND SYSTEMS FOR TRAFFIC ENGINEERING WITH REDUNDANCY

(71) Applicant: Huawei Technologies Co., Ltd., Shenzhen (CN)

(72) Inventor: Aaron Callard, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 272 days.

(21) Appl. No.: 14/659,068

(22) Filed: Mar. 16, 2015

(65) Prior Publication Data

US 2016/0277284 A1 Sep. 22, 2016

(51) Int. Cl.
*H04L 12/707* (2013.01)
*H04L 1/00* (2006.01)
(Continued)

(52) U.S. Cl.
CPC .............. *H04L 45/22* (2013.01); *H04L 1/004* (2013.01); *H04L 1/0075* (2013.01);
(Continued)

(58) Field of Classification Search
CPC ................ H04L 1/004; H04L 1/0075; H04L 2001/0092; H04L 45/021; H04L 45/22;
(Continued)

(56) References Cited

U.S. PATENT DOCUMENTS

| 8,780,693 B2* | 7/2014 | Kim | G06F 15/16 |
| | | | 370/216 |
| 2004/0141502 A1* | 7/2004 | Corson | H04W 36/18 |
| | | | 370/389 |

(Continued)

FOREIGN PATENT DOCUMENTS

| CN | 102957495 A | 3/2013 |
| CN | 104333908 A | 2/2015 |
| WO | 2011120473 A2 | 10/2011 |

OTHER PUBLICATIONS

Dr. Badran, Hosein F., "Service Provider Networking Infrastructures with MPLS", Jul. 5-5, 2001, IEEE, Computers and Communications, 2001, Proceedings. Sixth IEEE Symposium on. pp. 1-2.*

(Continued)

*Primary Examiner* — Un C Cho
*Assistant Examiner* — Shah Rahman
(74) *Attorney, Agent, or Firm* — Slater Matsil, LLP

(57) ABSTRACT

It is possible to improve backhaul resource utilization efficiency during dynamic point selection (DPS) transmissions by unicasting different portions of a traffic flow to different access points participating in the DPS transmission. Specifically, a traffic flow may be encoded to obtain forward error correction (FEC) packets, and different subsets of the FEC packets may be unicast to different access points participating in the DPS transmission. The subsets of FEC packets may have partial (or no) redundancy such that the amount of duplicative data communicated over the backhaul network is reduced when compared to multicasting the entire traffic flow to each access point participating in the DPS transmission. There may be different degrees of redundancy between subsets of FEC packets to achieve different traffic engineering (TE) objectives.

25 Claims, 5 Drawing Sheets

(51) Int. Cl.
*H04L 12/755* (2013.01)
*H04L 1/18* (2006.01)

(52) U.S. Cl.
CPC .............. *H04L 45/021* (2013.01); *H04L 1/18* (2013.01); *H04L 2001/0092* (2013.01)

(58) Field of Classification Search
CPC . H04L 2012/5678; H04L 47/125; H04L 1/18; H04W 28/08; G06F 9/5083
USPC ........................................................ 370/236
See application file for complete search history.

(56) References Cited

U.S. PATENT DOCUMENTS

| | | | |
|---|---|---|---|
| 2008/0144572 A1* | 6/2008 | Makhijani | H04L 1/1887 370/330 |
| 2011/0041021 A1 | 2/2011 | Khoshnevis et al. | |
| 2011/0051654 A1* | 3/2011 | Blankenship | H04B 7/2606 370/315 |
| 2011/0249569 A1* | 10/2011 | Mashino | H04J 11/0023 370/242 |
| 2014/0066081 A1 | 3/2014 | Cai et al. | |
| 2014/0233482 A1* | 8/2014 | Kimura | H04W 72/04 370/329 |
| 2015/0029970 A1* | 1/2015 | Niewczas | H04L 1/0006 370/329 |
| 2015/0045079 A1* | 2/2015 | Yano | H04W 72/0486 455/509 |
| 2015/0245402 A1* | 8/2015 | Mochizuki | H04W 36/22 370/331 |
| 2015/0373767 A1* | 12/2015 | Park | H04W 76/025 370/329 |
| 2016/0037511 A1* | 2/2016 | Vincze | H04B 7/024 370/329 |

OTHER PUBLICATIONS

Panasonic, "TSGR1#18(01)0031 Proposal of bit mapping for type-III HARQ", Jan. 15-18, 2001, 3GPP, TSG-RAN Working Group 1 Meeting #18, pp. all.*
3GPP, "3GPP TR 36.819 Coordinated multi-point operation for LTE physical layer aspects (Release 11)", Dec. 2011, 3GPP, V11.1.0, pp. 7-8.*
3GPP, "3rd Generation Partnership Project; Technical Specification Group Services and System Aspects; eCall Data Transfer; In-band modem solution; General description (Release 10)", Mar. 2011, 3rd Generation Partnership Project (3GPP), 3GPP TS 26.267 V10.0.0 (Mar. 2011), pp. 11.*
Barros, J., "Effective Delay Control in Online Network Coding," IEEE INFOCOM 2009, Apr. 19-25, 2009, pp. 208-216.
Sardari, M., et al., "Multilevel Diversity Coding Via Rateless Codes for Reliable and Scalable Video Multicasting," IEEE Communications Letters, vol. 17, No. 5, May 2013, pp. 956-959.
Schrage, Tobias, "Scheduling & HARQ", Seminar Ausgewählte Kapitel der Nachrichtentechnik, WS 2009/2010, LTE: Der Mobilfunk der Zukunft, Jan. 26, 2010, 13 pages.

* cited by examiner

METHODS AND SYSTEMS FOR TRAFFIC ENGINEERING WITH REDUNDANCY

TECHNICAL FIELD

The present invention relates generally to managing the allocation of resources in a network, and in particular embodiments, to methods and systems for traffic engineering with redundancy.

BACKGROUND

In wireless communications, the wireless link between a wireless access point and an end user (e.g., user equipment) is often the bottleneck. For example, the data rate over backhaul network connections between a network node (e.g., packet gateway) and the access point may be many times faster than the data rate over the wireless link. Some networks may attempt to compensate for this by transmitting information to a given user equipment from multiple access points using downlink coordinated multipoint (DL-CoMP) transmission techniques. Dynamic point selection (DPS) is one type of DL-CoMP technique that communicates a single traffic flow to multiple access points capable of performing transmissions to a user equipment (UE). The traffic flow is then communicated from whichever access point has the highest quality radio connection, thereby improving the data-rate experienced by the UE.

DPS transmission is often implemented between access points interconnected by high data rate backhaul connections. In such cases, the traffic flow is typically communicated from a network node (e.g., a packet gateway (PGW)) to one of the access points over the backhaul network, and then distributed from that access point to the other access points via the high-speed interconnections. In some instances, it is desirable to implement DPS transmissions between access points that do not have a high speed backhaul interconnection capable of transporting the traffic flow. For example, it may be desirable to implement DPS transmissions between access points in radio access networks (RANs) maintained by different network operators and/or in RANs utilizing different wireless protocols, e.g., between an LTE access network and a Wi-Fi access network. When DPS transmissions are implemented between access points that are not interconnected by high-speed backhaul connections, the traffic flow is typically multicast from the network node (e.g., PGW) to the set of access points participating in the DPS transmission. Multicasting traffic flows in this manner may significantly increase congestion over the backhaul network, and therefore efficient alternatives are desired.

SUMMARY OF THE INVENTION

Technical advantages are generally achieved by embodiments disclosed herein, which describe methods and systems for traffic engineering with redundancy.

In accordance with an embodiment, a method for facilitating efficient dynamic point selection (DPS) is provided. In this example, the method includes assigning portions of a traffic flow to be communicated over different unicast backhaul links to access points participating in DPS transmission, and instructing a network node to forward a first set of forward error correction (FEC) packets corresponding to the traffic flow over a first unicast path to a first access point, and to forward a second set of FEC packets corresponding to the traffic flow over a second unicast path to a second access point. The first set of FEC packets includes at least one FEC packet that is excluded from the second set of FEC packets. An apparatus for performing this method is also provided.

In accordance with another embodiment, a method for distributing traffic to access points participating in dynamic point selection (DPS) is provided. In this example, the method includes receiving a traffic flow addressed to a user equipment (UE). The traffic flow is scheduled to be transmitted to the UE by least a first access point and a second access point in accordance with a DPS transmission scheme. The method further includes encoding the traffic flow to produce at least a first set of forward error correction (FEC) packets and a second set of FEC packets, and communicating the first set of FEC packets over a first unicast path to the first access point, and c the second set of FEC packets over a second unicast path to the second access point. The first set of FEC packets includes at least one FEC packet that is excluded from the second set of FEC packets. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
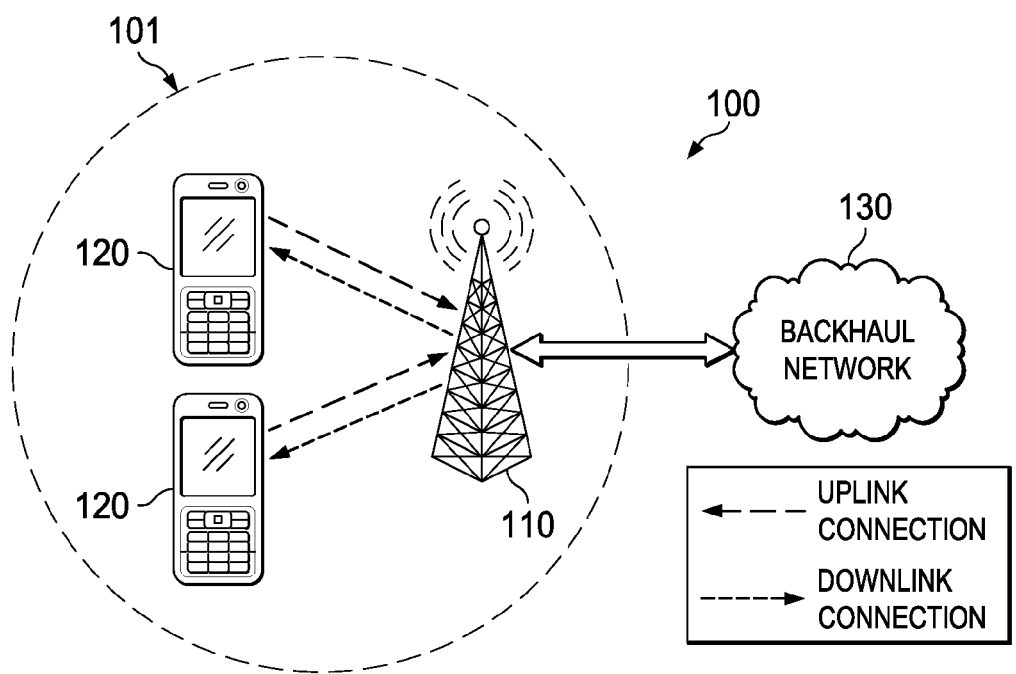
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure implement application layer forward error correction (FEC) codes in a traffic engineering (TE) environment to improve backhaul resource utilization efficiency during DPS transmissions. Application layer FEC codes are error correction codes that operate on blocks of data, such as RAPTOR codes and Network Coding (NC) codes. Traffic engineering (TE) environments include a central controller adapted to implement TE policies that configure routing parameters in a network, e.g., forwarding tables, packet prioritizations. Embodiment TE policies may configure FEC code parameters, such as coding/redundancy rates, as well as parameters for communicating FEC packets to access points participating in DPS transmissions.

More specifically, embodiment TE policies may increase backhaul resource utilization efficiency by unicasting different portions of a traffic flow to different access points participating in DPS transmission. Specifically, a traffic flow may be encoded to obtain different subsets of FEC packets, and each of the different subsets of FEC packets may be unicast to a different one of the access points participating in the DPS transmission. The subsets of FEC packets may have partial (or no) redundancy such that the amount of duplicative data communicated over the backhaul network is reduced when compared to multicasting the entire traffic flow to each access point participating in the DPS transmission. For example, a unicast subset of FEC packets may carry information bits that are excluded from other unicast subsets of FEC packets. As another example, one unicast subset of FEC packets may carry information bits, while another unicast subset of FEC packets may carry error correction information (e.g., parity bits) for those information bits. Different degrees of redundancy may exist between unicast subsets of FEC packets to achieve different traffic engineering (TE) objectives over the backhaul network. Moreover, different subsets of FEC packets may have different ratios of parity bits to information bits, and intermediate network nodes may be instructed to switch FEC packets in accordance with their respective ratios of parity bits to information bits. The instructions to switch FEC packets in accordance with respective ratios of parity bits to information bits may be recurring or otherwise long-standing instructions to be applied over a predefined period of time or until further notice, or alternative instructions, are provided/received. This may allow FEC packets carrying different ratios of parity to information bits to be switched using different policies. For example, FEC packets having higher ratios of parity to information bits may be switched at a lower priority than FEC packets having lower ratios of parity to information bits. These and other details are described in greater detail below.

As discussed herein, the term "DPS transmission" refers to any transmission scheme in which data is transmitted from multiple transmit points in a non-coordinated fashion such that the transmit nodes do not fully synchronize/coordinate which data is being sent prior to transmission. In multi-homing environments, DPS transmissions are performed by transmit nodes having different IP addresses. This often occurs when the different transmit points are using different wireless protocols. e.g., WiFi and LTE simultaneously. In heterogeneous network (het-net) environments, DPS transmissions are performed by transmit points using the same wireless protocols, with the multiple nodes transmitting scheduling and control information is a loosely coordinated fashion. In some embodiments, post-transmission signaling may be exchanged to indicate that data has been successfully transmitted and can be flushed from transmit buffers. Post-transmission signaling can be achieved via online network coding through the use of specialized ACK messages that are read by the intermediate nodes. This post-transmission signaling is consistent with non-coordinated DPS transmissions within the context of this disclosure, as the coordination occurs after the transmissions have taken place.

FIG. 1 illustrates a network 100 for communicating data. The network 100 includes a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, for example a base station such as an evolved Node B (eNB) as defined by the 3rd Generation Partnership Project (3GPP), a macro-cell, a femtocell, a Wi-Fi access point (AP), or other devices enabled for wireless communication. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station, such as a user equipment (UE), a mobile station (STA), and other wirelessly enabled devices. In some embodiments, the network 100 may includes various other wireless devices, such as relays, low power nodes.

Figure 2:
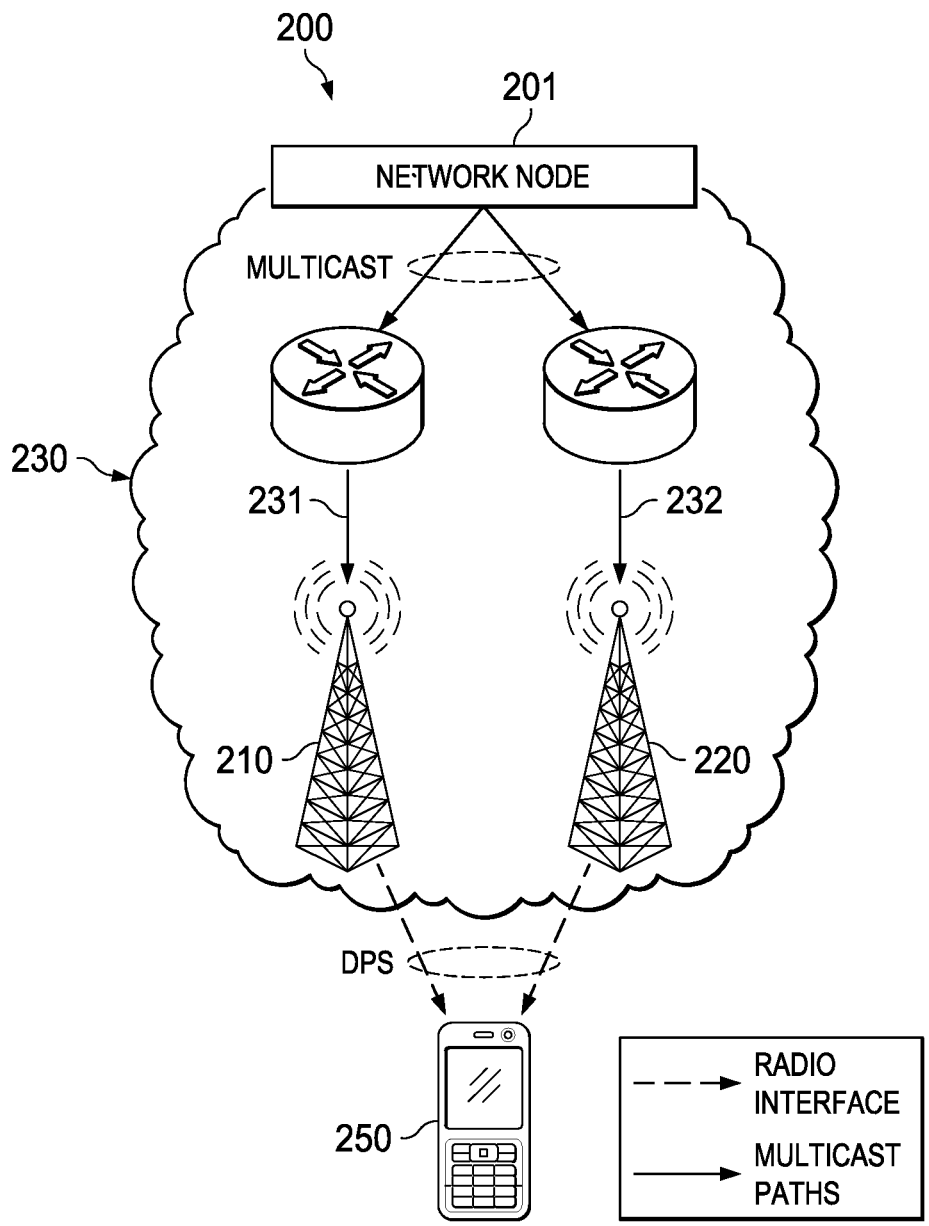
FIG. 2 illustrates a diagram of a conventional network architecture for communicating traffic flows to access points participating in DPS transmission.

FIG. 2 illustrates a traditional network architecture 200 for multi-casting traffic flows over backhaul links to access points participating in DPS transmission. As shown, the traditional network architecture 200 includes a common network node 201 and two access points 210, 220 that are interconnected with one another via a backhaul network. While two access points are depicted, it should be appreciated that aspects of this disclosure can be implemented between any number of access points participating in DPS transmission, e.g., three or more access points. The access points 210, 220 are adapted to transmit data to a user equipment (UE) 250 in accordance with a DPS transmission scheme. The common network node 201 receives a traffic flow destined for the user equipment 250, and determines that the traffic flow is a candidate for DPS transmission by the access points 210, 220. The network node 201 multicasts the entire traffic flow to the access points 210, 220 via the multi-cast paths 231, 232. The access points 210, 220 communicate the traffic flow to the UE 250 via DPS transmission. Multicasting the entire traffic flow to each of the access points 210, 220 participating in DPS transmission may increase congestion on the backhaul network 230.

Aspects of this disclosure increase backhaul resource utilization efficiency by unicasting portions of a traffic flow to different access points participating in DPS. In one example, this is achieved by encoding the traffic flow to obtain different partially (or non) redundant subsets of FEC packets, and then unicasting each subset of FEC packets to a different access point participating in DPS transmission. As discussed herein, forward error correction (FEC) packets are obtained by encoding data in a manner that introduces redundancy into the data stream. This redundancy results in a greater amount of data being communicated between an FEC encoder (e.g., transmitter) and FEC decoder (e.g., receiver). For example, a traffic flow may be encoded to obtain a string of FEC bits that includes information bits and parity bits. The information bits correspond to raw or encoded data of the traffic flow, and may be used during decoding to reproduce the traffic flow. The parity bits include error correction information for the information bits, and may be used during decoding to correct errors in the reproduced traffic flow. Stated differently, parity bits may allow the traffic flow to be successfully decoded even when some of the information bits are incorrect (e.g., erroneously decoded) or otherwise not available.

Figure 3:
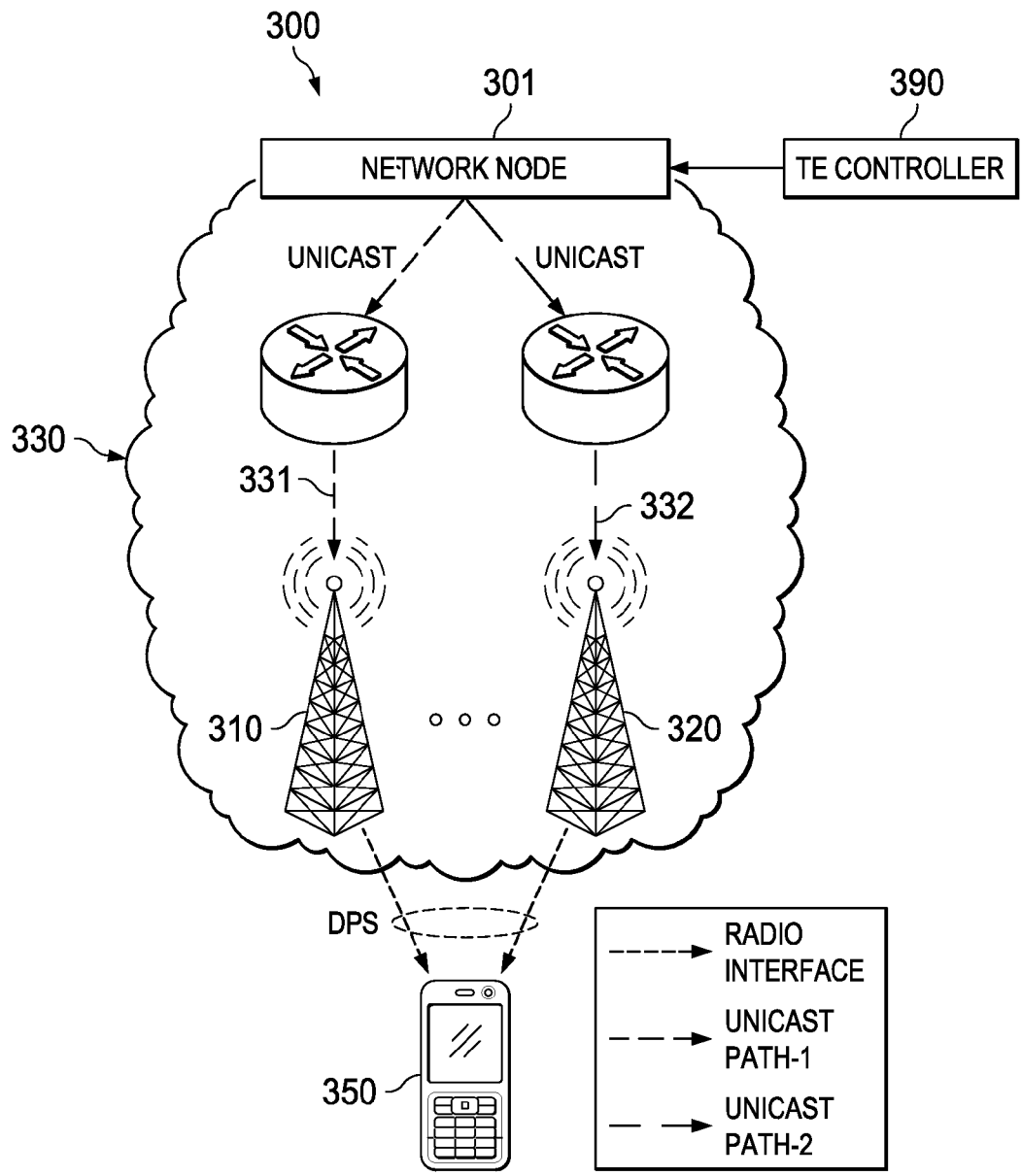
FIG. 3 illustrates a diagram of an embodiment network architecture for unicasting different subsets of FEC packets obtained from a traffic flow to different access points participating in DPS transmission.

FIG. 3 illustrates an embodiment network architecture 300 for unicasting different portions of a traffic flow to individual access points participating in DPS transmission. As shown, the embodiment network architecture 300 includes a backhaul network 330 for communicating data between a common network node 301 and a plurality of access points 310, 320, as well as a TE controller 390 for implementing TE policies. The access points 310, 320 are adapted to communicate data to a user equipment (UE) 350 in accordance with a DPS transmission scheme. It should be appreciated that any number of access points, e.g., three or more access points, can be included in the set of access points adapted for DPS transmission.

The common network node 301 is a data plane entity in the backhaul network 330. In an embodiment, the network node 301 is a gateway (e.g., packet gateway (PGW)) between the backhaul network 330 and a core network (not shown). In another embodiment, the network node 301 is a distributed gateway (e.g., serving gateway (SGW)) in a distributed EPC architecture. In other embodiments, the network node 301 is an intermediate gateway between sub-nets maintained by different network operators. The common network node 301 receives a traffic flow destined for the user equipment 350. The traffic flow may be communicated from another device connected to the backhaul network, e.g., another UE. Alternatively, the traffic flow may be communicated over a core network from a remote end, e.g., an applications server. Rather than multi-cast the entire traffic flow to each of the access points 310, 320, the common network node 301 unicasts different portions of the traffic flow to the respective access points 310, 320 over the respective unicast links 331, 332. For example, the network node 301 may encode the traffic flow to obtain FEC packets, and then unicast a subset of the FEC packets over each of the links 331, 332. While the same network node (i.e., the common network node 301) is described as both encoding the traffic to obtain the FEC packets, and unicasting different subsets of the FEC packets over unicast links 331, 332, those of ordinary skill will appreciate that the respective encoding and unicasting steps may be performed by different nodes. For example, an upstream node may encode the traffic to obtain FEC packets, and forward the FEC packets to a downstream node. The downstream node may then unicast different subsets of the FEC packets over divergent paths. Those of ordinary skill will also appreciate that the unicast links 331, 332 may share some common hops. For example, the unicast links 331, 332 may be virtual paths that initially extend over the same hops before diverging at a downstream node. As another example, the unicast links 331, 332 may share some common intermediate hops, e.g., diverge initially, re-converge over some intermediate links, and then re-diverge before reaching the APs, 310, 320.

In some embodiments, there is some redundancy between the unicast subsets of FEC packets. For example, the subset of FEC packets communicated over the link 331 may include the full set of information bits generated from the traffic flow (e.g., the entire traffic flow), while the subset of FEC packets communicated over the link 332 may include a sub-set of those information bits (i.e., less than the entire traffic flow) over the link 332. As another example, the subsets of FEC packets communicated over the link 331, 332 may include partially overlapping subsets of information bits generated from the traffic flow. In other embodiments, the unicast subsets of FEC packets include no redundancy, e.g., mutually exclusive subsets of information bits. In yet other embodiments, one unicast subset of FEC packets includes information bits generated from the traffic flow, and the other unicast subset of FEC packets includes parity bits corresponding to those information bits.

In some embodiments, the common network node 301 unicasts different portions of the traffic flow in accordance with a traffic engineering (TE) policy provided by the TE controller 390. The TE policy may define various parameters of the unicast distribution of the traffic flow and/or the DPS transmission scheme. For example, the TE policy may specify which access points participate in the DPS transmission scheme, as well as the links over which the unicast portions of the traffic flow are transported to those access points. The TE policy may also define which FEC codes are used to encode the traffic flow, as well as which subsets of FEC packets are forwarded over each of the links. The TE policy may also define how much redundancy there is between respective unicast portions of the traffic flow. The amount of redundancy between unicast portions of a traffic flow can be manipulated in various ways. For example, the redundancy level and/or ratios of data between different paths could be a parameter or characteristic of the FEC coding scheme, e.g., such as a RAPTOR code. The FEC code may be generated independently from path splitting (e.g., using a middle box). The FEC code could interact with the splitting policy such that different levels of redundancy are sent down different paths, or redundancy is not generated until a flow path is split, minimizing the overhead until that point. Note that many FEC encoders are systematic in nature, in that the output of the FEC code includes data which is unchanged, followed by parity bits which are a function of the original data bit. Thus the FEC encoding may result in a set of un-encoded data, as well as a set of encoded data.

Figure 4:
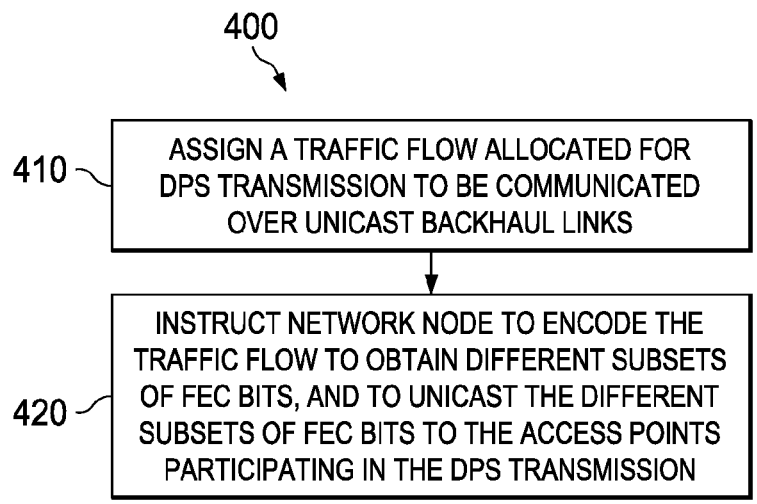
FIG. 4 illustrates a flowchart of an embodiment method for assigning different subsets of FEC packets to be unicast to different access points participating in DPS transmission.

FIG. 4 illustrates a flowchart of an embodiment method 400 for facilitating efficient communication of portions of traffic flows to access points participating in DPS transmission, as may be performed by a traffic engineering (TE) controller. At step 410, the TE controller assigns a traffic flow allocated for DPS transmission to be communicated over unicast backhaul links. As discussed herein, traffic flows allocated for DPS transmission are referred to as "DPS traffic flows." At step 420, the TE controller instructs a network node to encode the traffic flow to obtain different subsets of FEC bits, and to unicast the different subsets of FEC bits to the access points participating in the DPS transmission. In some embodiments, the TE controller instructs an upstream node to encode the traffic to obtain FEC bits, and a downstream node to unicast different sets of the FEC bits to the access points participating in the DPS transmission. In some embodiments, the TE controller dynamically assigns DPS traffic flows to be communicated over unicast backhaul links as the traffic flows are received by the backhaul network.

In other embodiments, the TE controller statically (or semi-statically) pre-assigns DPS traffic flows to be communicated over unicast backhaul links prior to the traffic flows being generated and/or received by the backhaul network. In such embodiments, the step of instructing the network node to communicate different portions of the traffic flow over different unicast links may include configuring the network node in accordance with a traffic engineering policy. For example, the step of instructing the network node to communicate different portions of the traffic flow over different unicast links may include preconfiguring a table in the network node (e.g., a forwarding information base (FIB) table) to forward different portions of a DPS traffic flow over different unicast paths when a criterion (or set of criteria) is satisfied. The criterion for forwarding different portions the DPS traffic flow over different unicast backhaul links may relate to a characteristic associated with the DPS traffic flow, e.g., a traffic type, a quality of service (QoS) parameter, a source and/or destination address, a service level agreement (SLA) or subscriber classification. The criteria for forwarding different portions the DPS traffic flow over different unicast backhaul links may also consider a characteristic associated with the network. For example, unicast forwarding of DPS traffic flows over the backhaul network may be implemented to reduce congestion when a traffic load on the network exceeds a threshold.

In some embodiments, a TE controller may instruct a common network node to encode a traffic flow in accordance with a TE policy. The TE policy may dictate that different subsets of FEC packets have different ratios of parity bits to information bits. For example, one subset of FEC packets may have a higher proportion of parity bits. The TE controller may also instruct intermediate network nodes to switch FEC packets in accordance with the packet's ratio of parity bits to information bits. For example, the TE controller may instruct a network element to switch FEC packets having higher proportions of parity bits with a lower priority than FEC packets having higher proportions of information bits, or to forward them along different paths. In some embodiments, FEC packets having a ratio of parity bits to information bits that exceeds a threshold may be dropped when a criteria is met. For example, if a certain fraction of the traffic flow (e.g., eighty percent) has been successfully decoded, then the intermediate network node may be instructed to drop FEC packets carrying large proportions of parity bits. In some embodiments, intermediate network nodes may measure ratios of parity bits to information bits carried by FEC packets communicated over their paths, and report the measured ratio of parity bits to information bits to a control plane entity. This information may also be available in the header of the packet. This may be particularly helpful in inter-domain TE environments, when a TE controller in a source domain sets the ratio of parity bits to information bits, and a TE controller in a downstream domain (e.g., destination domain, interconnecting domain) is adapted to dynamically configure TE policies implemented in that domain based on, for example, the ratio of parity to information bits in a given unicast subset of FEC packets and/or a correlation between different unicast subsets of FEC packets.

Figure 5:
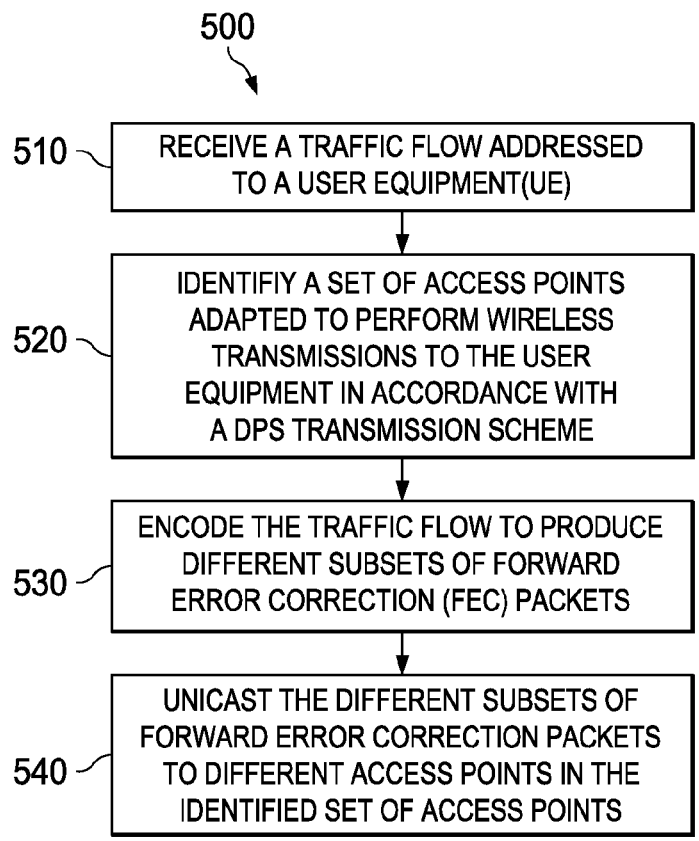
FIG. 5 illustrates a flowchart of an embodiment method for unicasting different subsets of FEC packets to different access points participating in DPS transmission.

FIG. 5 illustrates a flowchart of an embodiment method 500 for efficiently communicating subsets of FEC packets to access points participating in a DPS transmission, as may be performed by a network node. At step 510, the network node receives a traffic flow addressed to a user equipment (UE). At step 520, the network node identifies a set of two or more access points adapted to perform wireless transmissions to the UE in accordance with a DPS transmission scheme. At step 530, the network node encodes the traffic flow to produce different subsets of forward error correction (FEC) packets. The different subsets of FEC packets may be obtained by applying a single FEC code to the traffic flow to produce a set of FEC packets, and then subdividing the set of FEC packets to obtain the different subsets of FEC packets. Alternatively, the different subsets of FEC packets may be obtained by applying different FEC codes to the traffic flow. At step 540, where the network node unicasts the different subsets of FEC packets to different access points in the set of access points. The access points then transmit the traffic flow to the UE in accordance with the DPS transmission scheme.

In some embodiments, network codes (NC) are used to form different paths. The more paths formed using NCs, the greater the overhead on each path. In some embodiments, a packet will traverse a limited number of fixed paths, which may allow for reduced overhead since much of the header information may be known without explicit signaling. Header length may be further reduced through Robust Header Compression (ROHC). In some embodiments, header formulation over fixed paths may be reduced such that the increase, when compared with a single path, is very small (e.g., less than 1 byte) or nonexistent. In some embodiments, transmission control protocol (TCP) information is mixed in with data. In some embodiments, an NC scrambling sequence is performed as a deterministic function of the path, and therefore is not required to be explicitly signaled.

Aspects of this disclosure provide a TE formulation that improves error correction resiliency. A redundant path over a backhaul network is provided, and wireless resources are multiplexed together. Embodiment TE formulations for multi-zoned networks are also provided. In such embodiments, the demand constraint may be modeled in accordance with the following: $x_1 \leq d_1 + e_1$; $x_2 \leq d_2 + e_2$; $x_1 + x_2 = d_1 + d_2$, where $x_1$ and $x_2$ are the amount of data communicated over respective unicast links, $x_1$ and $x_2$ are the amount of non-redundant data communicated over the respective unicast links; and $e_1$ and $e_2$ are the amount of redundant data communicated over respective unicast links.

Traffic engineering policy formulation for unicast transmission of DPS traffic flows over backhaul resources may consider a variety of factors. For example, when provisioning encoders, the TE controller may consider how much redundancy to introduce, which portions of data to send to participating access points, and what encoding parameters to use (e.g., how much data to encode, how much data is left un-encoded). As another example, when configuring communications between domains, the TE controller may consider how much encoded data is sent, how much correlation to introduce to encoded data, network demand, and reverse link feedback parameters. As used herein, the term "correlation" refers to the degree in which data overlaps between unicast subsets of FEC packets. For example, if unicast subsets of FEC packets carry identical FEC packets/bits then they are considered to be fully correlated. However, different encodings of a traffic flow may not be considered fully correlated, as they can both be used to decode the final information. As yet another example, when configuring measurements to be taken by egress nodes, the TE controller may consider how much redundant data is sent, encoding parameters, and the detection of reverse link feedback. As yet another example, when provisioning nodes, the TE controller may consider how much data to block or flag as superfluous, and how much encoded data to block or flag as superfluous.

For instance, a TE controller could configure a network node to not transmit any packet which corresponds to parity data, if that information is being successfully transmitted through the network elsewhere.

Figure 6:
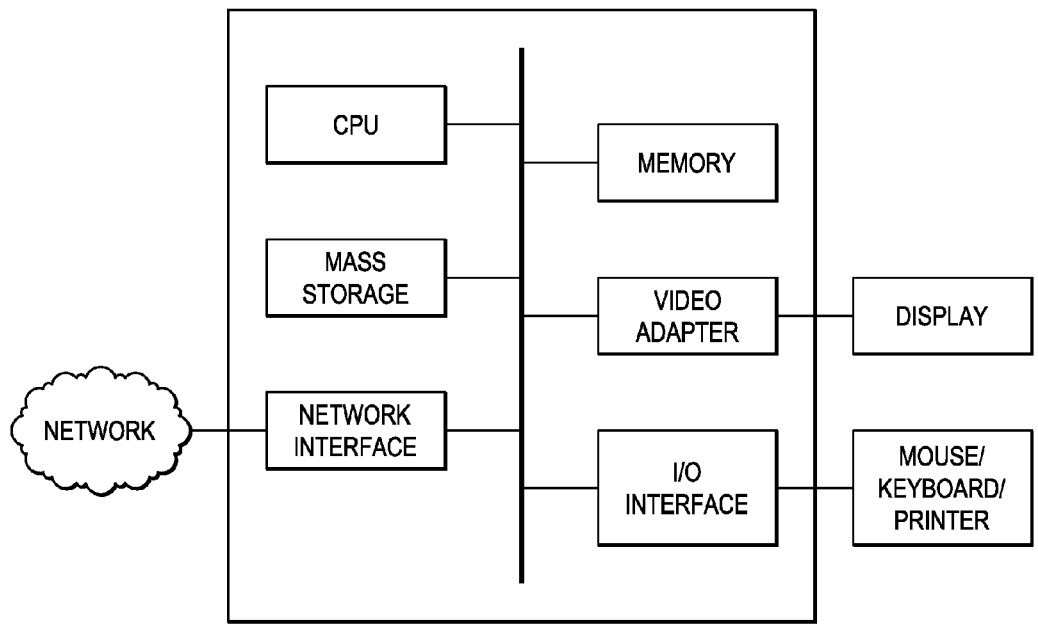
FIG. 6 illustrates a diagram of an embodiment computing platform.

FIG. 6 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers. The processing system may include a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may include any type of electronic data processor. The memory may include any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may include any type of storage device configured to store data, programs, and other information and to make the data, programs, and other information accessible via the bus. The mass storage device may include, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may include wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 7:
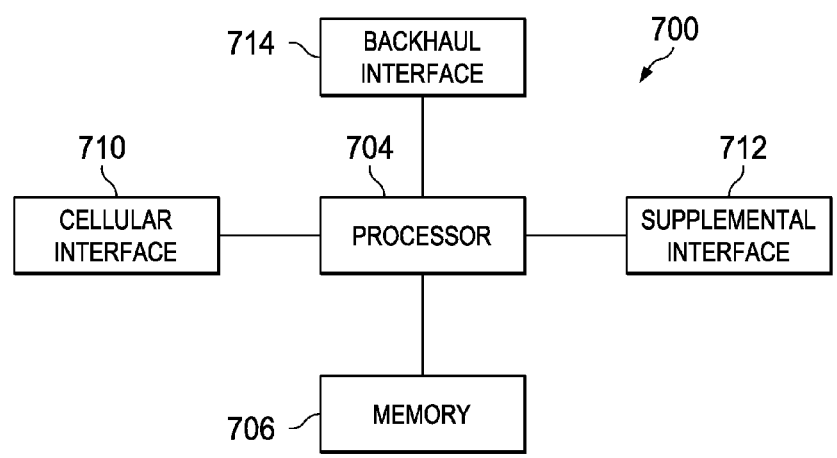
FIG. 7 illustrates a diagram of an embodiment communications device.

FIG. 7 illustrates a block diagram of an embodiment communications device 700, which may be equivalent to one or more devices (e.g., UEs, eNBs, TE controllers) discussed above. The communications device 700 may include a processor 704, a memory 706, a cellular interface 710, a supplemental interface 712, and a backhaul interface 714, which may (or may not) be arranged as shown in FIG. 7. The processor 704 may be any component capable of performing computations and/or other processing related tasks, and the memory 706 may be any component capable of storing programming and/or instructions for the processor 704. The cellular interface 710 may be any component or collection of components that allows the communications device 700 to communicate using a cellular signal, and may be used to receive and/or transmit information over a cellular connection of a cellular network. The supplemental interface 712 may be any component or collection of components that allows the communications device 700 to communicate data or control information via a supplemental protocol. For instance, the supplemental interface 712 may be a non-cellular wireless interface for communicating in accordance with a Wireless-Fidelity (Wi-Fi) or Bluetooth protocol. Alternatively, the supplemental interface 712 may be a wireline interface. The backhaul interface 714 may be optionally included in the communications device 700, and may include any component or collection of components that allows the communications device 700 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for dynamic point selection (DPS), the method comprising:
 assigning, by a traffic engineering (TE) controller, portions of a traffic flow to be communicated over different unicast backhaul links to access points participating in a downlink DPS transmission of the traffic flow; and
 instructing a network node to forward a first set of forward error correction (FEC) packets corresponding to the traffic flow over a first unicast path to a first one of the access points participating in the downlink DPS transmission of the traffic flow, and to forward a second set of FEC packets corresponding to the traffic flow over a second unicast path to a second one of the access points participating in the downlink DPS transmission of the traffic flow, wherein the first set of FEC packets includes at least one FEC packet that is excluded from the second set of FEC packets, and the first set of FEC packets and the second set of FEC packets are produced by the network node or an upstream node, by encoding the traffic flow.

2. The method of claim 1, wherein the traffic flow is communicated in accordance with the downlink DPS transmission to a user equipment.

3. The method of claim 1, wherein the first unicast path extends from the network node to the first access point and the second unicast path extends from the network node to the second access point.

4. The method of claim 1, wherein at least some common information bits are shared between the first set of FEC packets and the second set of FEC packets.

5. The method of claim 4, wherein at least some redundant data is communicated to each of the first access point and the second access point.

6. The method of claim 1, wherein the first set of FEC packets includes parity information excluded from the second set of FEC packets.

7. The method of claim 1, wherein the first set of FEC packets includes at least some information bits that are excluded from the second set of FEC packets, the information bits corresponding to raw or encoded data of the traffic flow.

8. The method of claim 7, wherein the second set of FEC packets includes at least some parity bits that are excluded from the first set of FEC packets, the parity bits being error correction information for the information bits carried by the first set of FEC packets.

9. The method of claim 1, wherein more FEC packets are communicated over the first unicast path than the second unicast path.

10. The method of claim 1, further comprising:
instructing the network node to encode the traffic flow such that that FEC packets in the first set of FEC packets have a different ratio of parity bits to information bits than FEC packets in the second set of FEC packets.

11. The method of claim 10, further comprising:
instructing an intermediate network node on the first unicast path to measure a ratio of parity bits to information bits carried by FEC packets communicated over the first unicast path, and to report the measured ratio of parity bits to information bits to a control plane entity.

12. The method of claim 1, further comprising:
instructing intermediary network nodes on at least one of the first unicast path and the second unicast path to switch FEC packets communicated over the respective unicast paths in accordance with a ratio of parity bits to information bits carried by the FEC packets such that FEC packets carrying higher ratios of parity bits to information bits are switched using a different policy than FEC packets carrying lower ratios of parity bits to information bits.

13. The method of claim 12, further comprising:
instructing intermediary network nodes on at least one of the first unicast path and the second unicast path to switch FEC packets carrying higher ratios of parity bits to information bits at a lower priority level than FEC packets carrying lower ratios of parity bits to information bits.

14. The method of claim 1, wherein instructing the network node to forward the first set of FEC packets over the first unicast path, and to forward the second set of FEC packets over the second unicast path comprises:
preconfiguring the network node to forward different portions of traffic allocated for the downlink DPS transmission over different unicast paths when a criteria is satisfied, wherein the network node is preconfigured prior to the network node receiving the traffic flow.

15. The method of claim 14, wherein preconfiguring the network node comprises updating or establishing a forwarding information base (FIB) table in the network node.

16. The method of claim 1, wherein the first unicast path and the second unicast path share at least some common hops.

17. The method of claim 1, wherein FEC parameters used to generate the first set of FEC packets and the second set of FEC packets are decided by the controller.

18. The method of claim 1, wherein the first unicast path and the second unicast path are generated by the network node or the upstream node, by encoding the traffic flow.

19. A traffic engineering (TE) controller comprising:
a processor; and
a computer readable storage medium storing programming for execution by the processor, the programming including instructions to:
assign portions of a traffic flow to be communicated over different unicast backhaul links to access points participating in a downlink DPS transmission of the traffic flow; and
instruct a network node to forward a first set of forward error correction (FEC) packets corresponding to the traffic flow over a first unicast path to a first one of the access points participating in the downlink DPS transmission of the traffic flow, and to forward a second set of FEC packets corresponding to the traffic flow over a second unicast path to a second one of the access points participating in the downlink DPS transmission of the traffic flow, wherein the first set of FEC packets includes at least one FEC packet that is excluded from the second set of FEC packets, and the first set of FEC packets and the second set of FEC packets are produced by the network node or an upstream node, by encoding the traffic flow.

20. A method for distributing traffic to access points participating in dynamic point selection (DPS), the method comprising:
receiving, by a network node, a traffic flow addressed to a user equipment (UE), the traffic flow scheduled to be transmitted to the UE by at least a first access point and a second access point in accordance with a downlink DPS transmission scheme of the traffic flow; and
communicating, by the network node, at least a first set of forward error correction (FEC) packets over a first unicast path to the first access point, and a second set of FEC packets over a second unicast path to the second access point, wherein the first set of FEC packets includes at least one FEC packet that is excluded from the second set of FEC packets, and the first set of FEC packets and the second set of FEC packets are produced by the network node or an upstream node, by encoding the traffic flow.

21. The method of claim 20, wherein the set of FEC packets and the second set of FEC packets share at least some information bits such that there at least some redundancy in respective bit streams communicated to the first access point and the second access point.

22. The method of claim 20, wherein the first set of FEC packets includes at least some information bits that are excluded from the second set of FEC packets, the information bits corresponding to raw or encoded data of a media stream being carried by the traffic flow.

23. The method of claim 22, wherein the second set of FEC packets includes at least some parity bits that are excluded from the first set of FEC packets, the parity bits being error correction information for the information bits carried by the first set of FEC packets.

24. The method of claim 20, wherein the first set of FEC packets is communicated over the first unicast path at a different rate than the second set of FEC packets is communicated over the second unicast path.

25. A network node comprising:
a processor; and
a computer readable storage medium storing programming for execution by the processor, the programming including instructions to:
receive a traffic flow addressed to a user equipment (UE), the traffic flow scheduled to be transmitted to the UE by at least a first access point and a second access point in accordance with a downlink DPS transmission scheme of the traffic flow;

communicate at least a first set of forward error correction (FEC) packets over a first unicast path to the first access point, and a second set of FEC packets over a second unicast path to the second access point, wherein the first set of FEC packets includes one FEC packet that is excluded from the second set of FEC packets, and the first set of FEC packets and the second set of FEC packets are produced by the network node or an upstream node, by encoding the traffic flow.

\* \* \* \* \*

UNITED STATES PATENT AND TRADEMARK OFFICE
CERTIFICATE OF CORRECTION

PATENT NO. : 9,998,355 B2
APPLICATION NO. : 14/659068
DATED : June 12, 2018
INVENTOR(S) : Callard Page 1 of 1

It is certified that error appears in the above-identified patent and that said Letters Patent is hereby corrected as shown below:

In the Claims

In Column 13, Line 3, Claim 25, delete "of the traffic flow;" and insert --of the traffic flow; and--.

Signed and Sealed this
Fourteenth Day of August, 2018

Andrei Iancu
*Director of the United States Patent and Trademark Office*